US012461024B2

(12) United States Patent
Weres

(10) Patent No.: US 12,461,024 B2
(45) Date of Patent: Nov. 4, 2025

(54) COLORIMETRIC ANALYSIS OF CHLORINE BLEACH

(71) Applicant: Oleh Weres, Reno, NV (US)

(72) Inventor: Oleh Weres, Reno, NV (US)

( * ) Notice: Subject to any disclaimer, the term of this patent is extended or adjusted under 35 U.S.C. 154(b) by 0 days.

(21) Appl. No.: 18/967,558

(22) Filed: Dec. 3, 2024

(65) Prior Publication Data

US 2025/0180470 A1 Jun. 5, 2025

Related U.S. Application Data

(60) Provisional application No. 63/606,538, filed on Dec. 5, 2023.

(51) Int. Cl.
*G01N 21/31* (2006.01)

(52) U.S. Cl.
CPC .................................... *G01N 21/31* (2013.01)

(58) Field of Classification Search
None
See application file for complete search history.

(56) References Cited

U.S. PATENT DOCUMENTS

| | | | | | |
|---|---|---|---|---|---|
| 4,875,762 | A * | 10/1989 | Kato | G02F 1/1516 | 359/241 |
| 5,654,198 | A * | 8/1997 | Carrier | G01N 21/31 | 436/164 |
| 6,037,318 | A * | 3/2000 | Na | C11D 3/349 | 510/370 |
| 7,943,389 | B2 * | 5/2011 | Rigsby | G01N 33/182 | 424/661 |
| 11,884,540 | B2 | 1/2024 | Weres et al. | | |
| 2013/0217610 | A1 * | 8/2013 | Garner | B05C 9/06 | 510/367 |
| 2013/0330245 | A1 * | 12/2013 | Duncan | B01L 3/502715 | 422/502 |
| 2022/0388843 | A1 | 12/2022 | Weres et al. | | |

(Continued)

FOREIGN PATENT DOCUMENTS

RU 2123182 C1 * 12/1998

OTHER PUBLICATIONS

Elmas et al., "Photometric Sensing of Active Chlorine, Total Chlorine, and pH on a Microfluidic Chip for Online Swimming Pool Monitoring", Sensors, 2020, 20(1), 3099 (Year: 2020).*

(Continued)

*Primary Examiner* — Henry H Nguyen
(74) *Attorney, Agent, or Firm* — Oleh Weres

(57) ABSTRACT

Reaction of bleach with a soluble bromide salt to produce brightly colored hypobromite ion enables easy colorimetric measurement of active chlorine or NaOCl content of bleach. A solution comprising a soluble bromide salt, a suitale buffer and water of dilution is combined with bleach producing a stable color over a wide range of bleach composition. This analytical method is well suited for use outside the laboratory at sites where bleach is stored or used; for example, but not limited to industrial sites that use bleach, places where bleach is used to destroy microbes and/or hazardous substances in water, and commercial laundries. In addition to analyzing bleach itself, process water streams containing some amount of bleach or another source of active chlorine can be analyzed over a wide range of NaOCl concentration.

20 Claims, 7 Drawing Sheets

(56) References Cited

U.S. PATENT DOCUMENTS

2024/0116758 A1 4/2024 Weres et al.

OTHER PUBLICATIONS

Translation of RU 2123182 C1, Chervjakova , Dec. 10, 1998 (Year: 1998).*

L. Farkas and F.S. Klein (1948) On the Photo-Chemistry of Some lons in Solution. J. Chemical Physics, 16:9, 896-893. Figure 3 shows the UV Absorption Spectra of OBr- and HOBr at 250 to 360 nm.

D.L. Harp (2002) Current Technology of Chlorine Analysis for Water and Wastewater, Technical Information Series—Booklet No. 17. Hach Company, Loveland, Colorado. DPD colorimetric method described on pp. 2-4, with range of Cl2 equivalent 0.01-4.0 or alternatively 0.03-5.0 mg/liter. Iodometric Method by Titration described on p. 6 with range 0-70,000 mg Cl2 equivalent/liter.

J.C.O'C. Young (2019) A Colorimetric Approach to Hypochlorite Bleach Analysis. Chemical Education, v.24, pp. 1-5. Colorimetric analysis of bleach wherein bleach diluted 50:1 (p. 4) is reacted with potassium iodide in acid solution to produce strongly colored iodine (I2) with absorption measured at 470 nm.

Palintest Water Analysis Technologies (2023) Chlorine H[igh] R[ange] Test Method Technical Information. Golden, Colorado. Commercial implementation of the analytical method described by Young, with stated range 0-250 mg/liter Cl2 equivalent.

K. Evans (2020) Quantification of Sodium Hypochlorite in Disinfectants. PerkinElmer, Inc., Seer Green, UK. Describes measuring active chlorine in bleach by UV Absorption without using chemical reagents. Absorption is measured at 293 nm, where absorption by NaOCl is strongest.

SP-200 Oxipocket Pocket Oxidizer—Colorimeter/Fluorometer. Portable instrument used to analyze bleach by measuring the faint color of NaOCl without using reagents. Two ranges: 0.50-16.0 weight % Cl2 equivalent, and 0.015-1.00 weight % Cl2 equivalent. Pyxis Company, Lafayette, Colorado (no date). Downloaded from www.pyxis-lab.com Apr. 23, 2023.

* cited by examiner

Fig. 4. Using Phosphate Buffers
Each dilute reagent solution also contains 0.225M KBr.
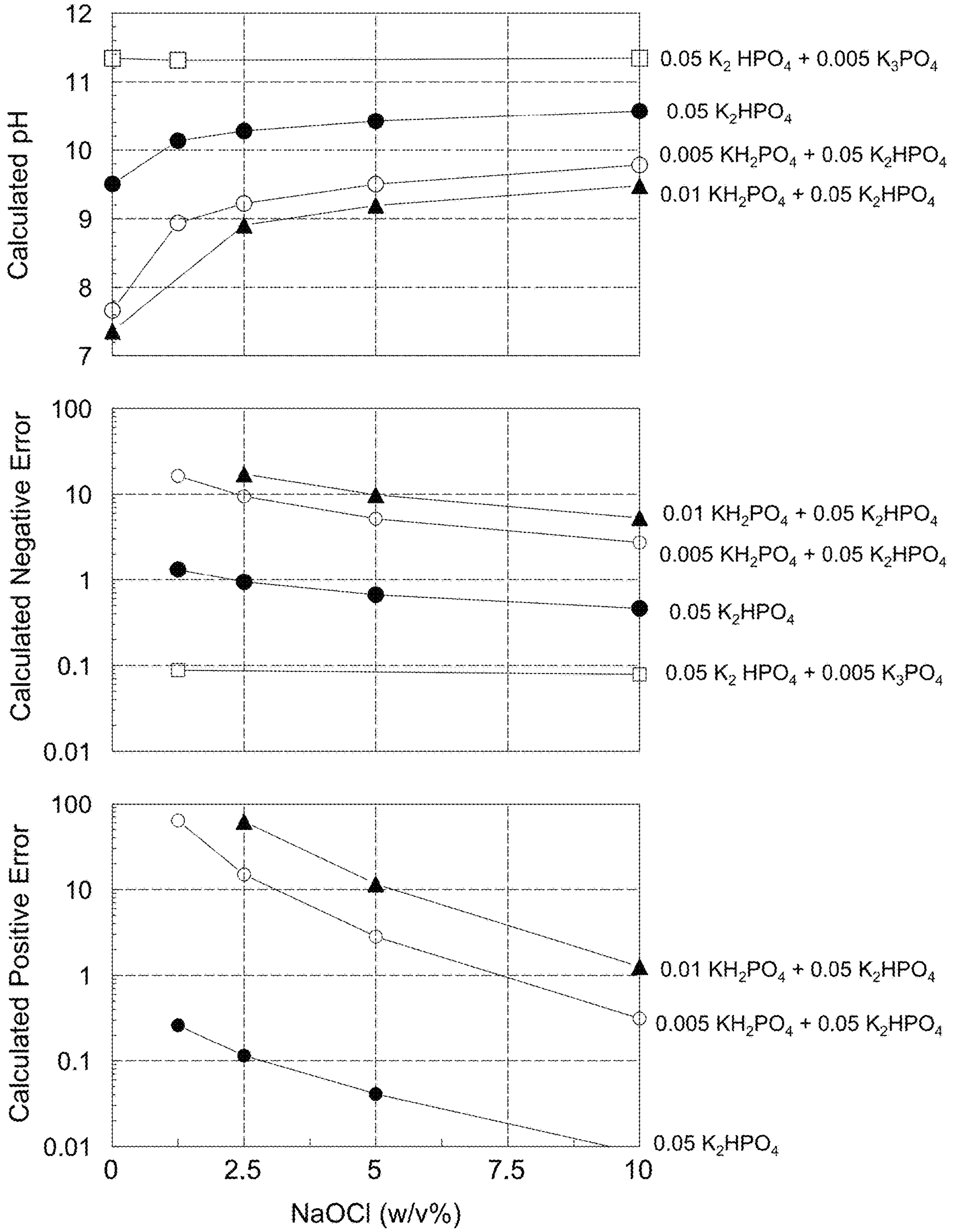

Fig. 5. Using Carbonate Buffers
Each dilute reagent solution also contains 0.225M KBr.
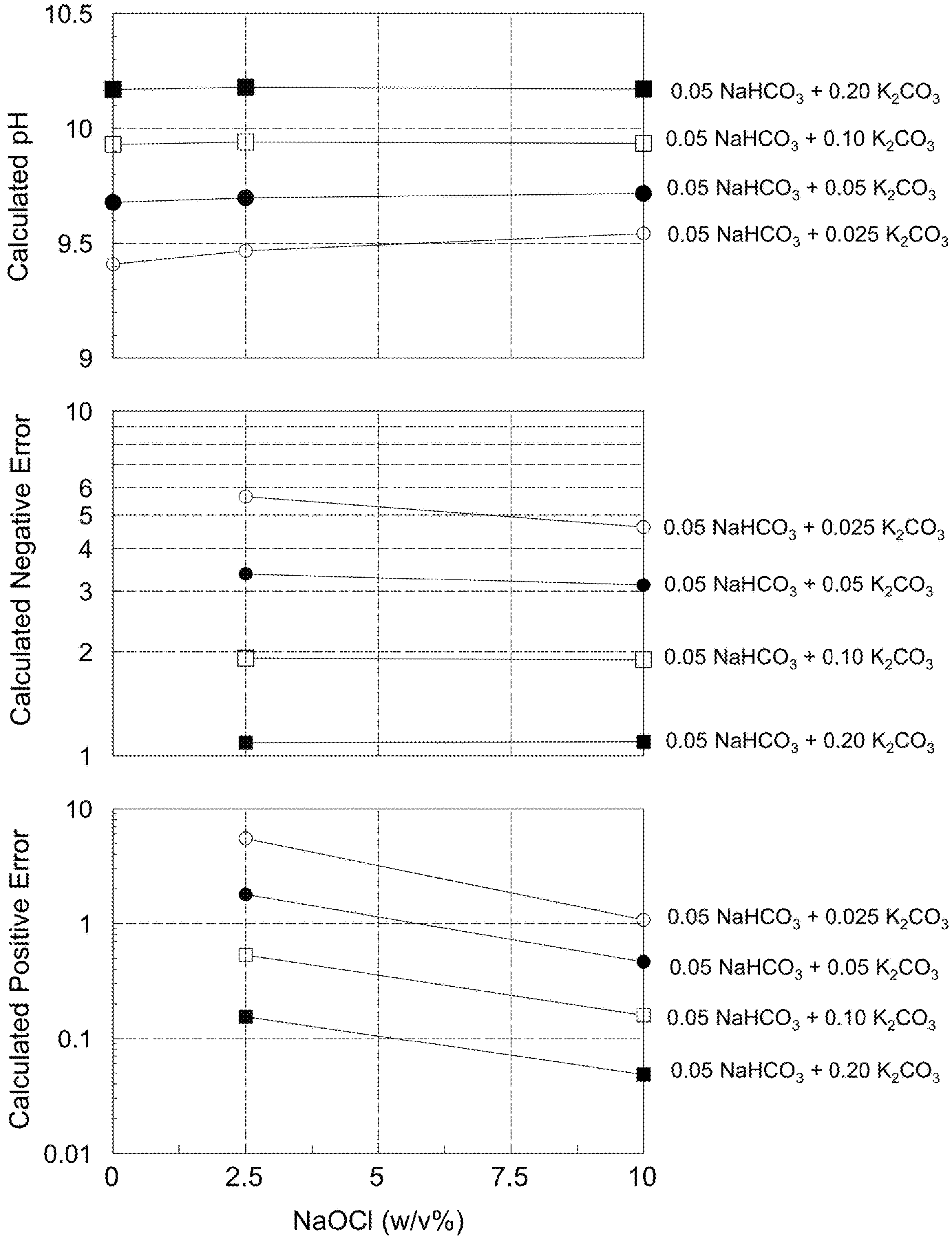

Fig. 6. Using Borate Buffers
Each dilute reagent solution also contains 0.225M KBr.
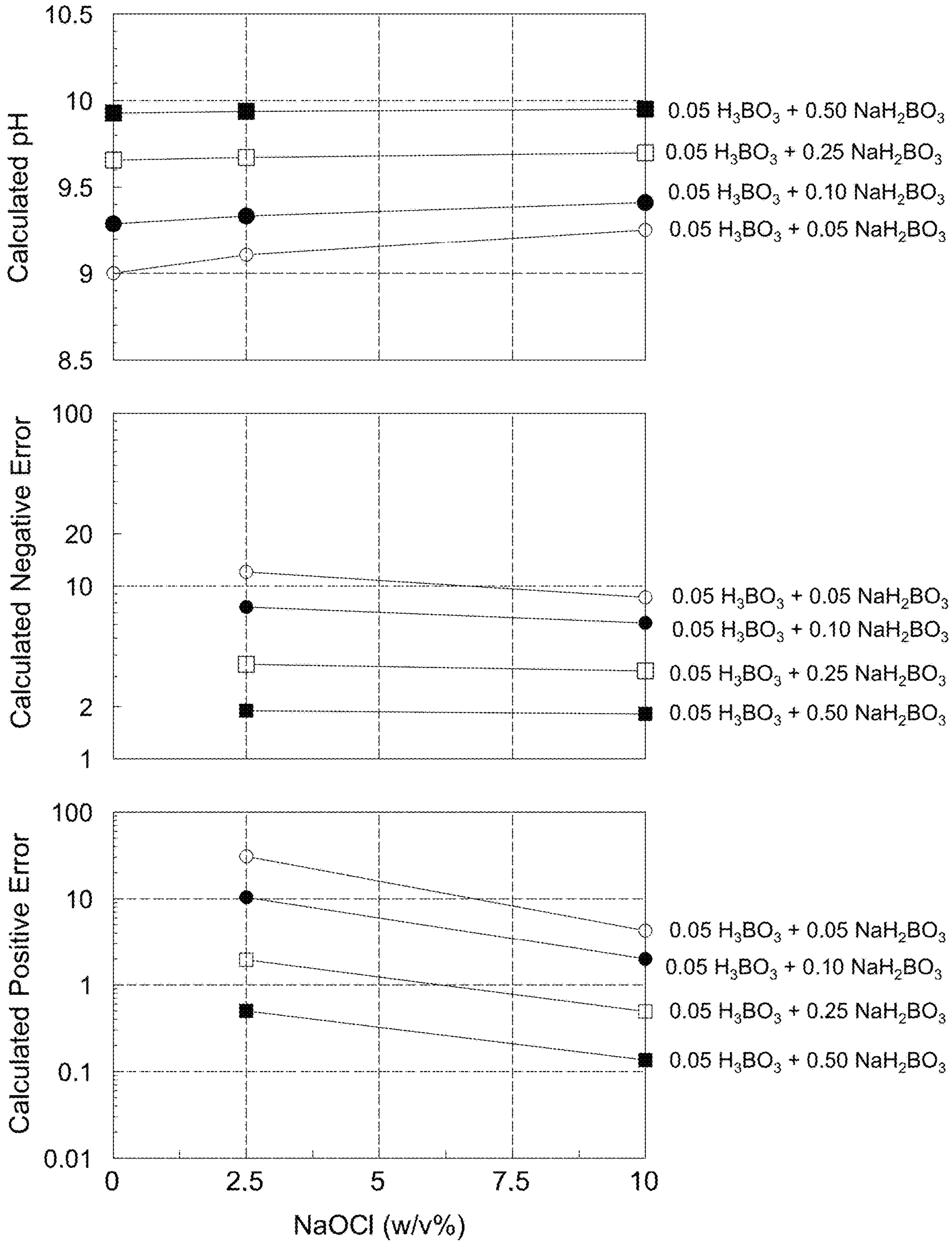

Figure 7. Realistic Demonstration of the Method
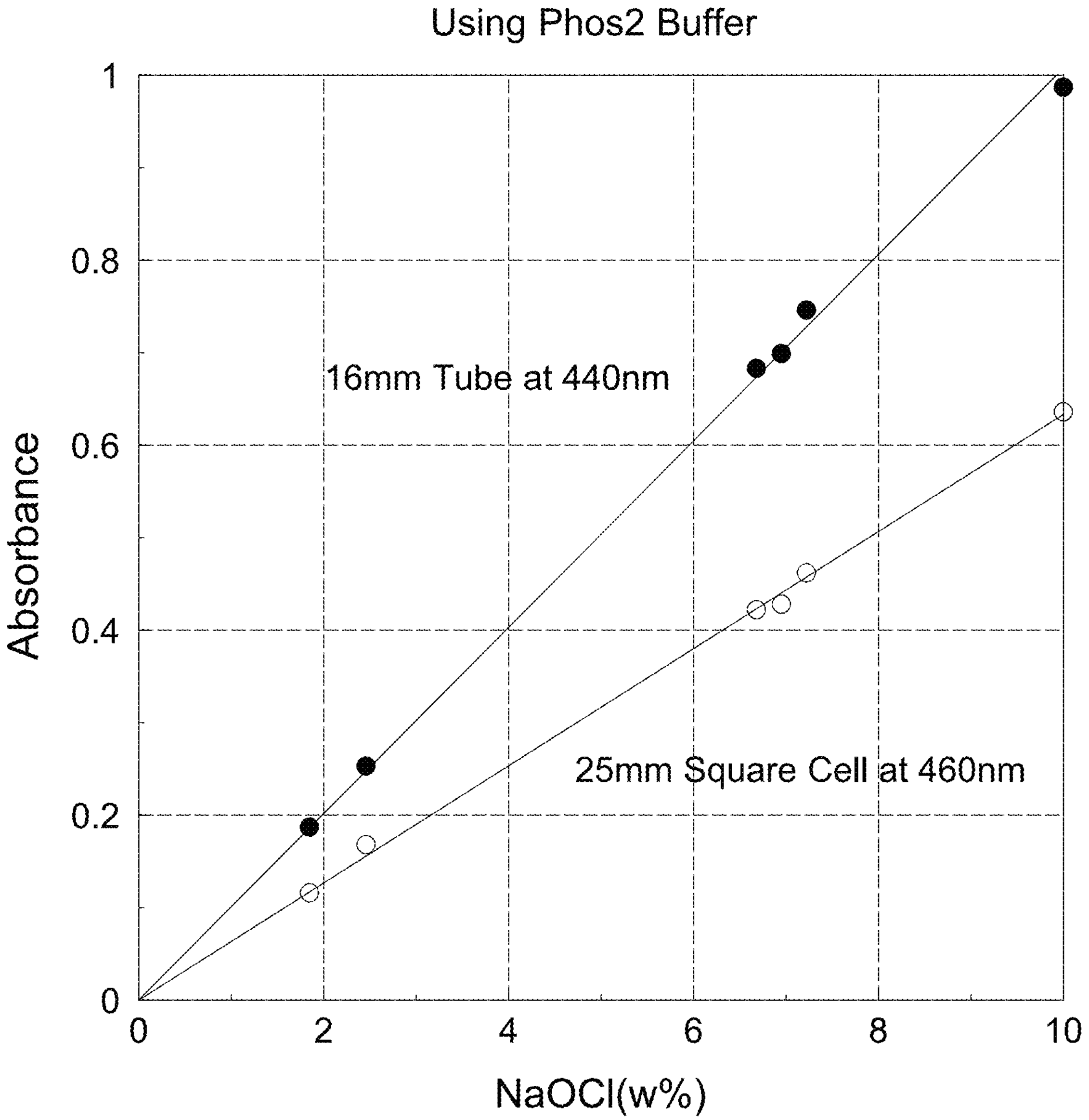

COLORIMETRIC ANALYSIS OF CHLORINE BLEACH

FIELD OF THE INVENTION

A simple colorimetric method to analyze chlorine bleach is provided.

BACKGROUND OF THE INVENTION

Benefit is claimed of Provisional Patent Application 63/606,538 filed Dec. 5, 2023.

U.S. Pat. No. 11,884,540 of Weres and Baron is hereby included by reference.

Sodium hypochlorite bleach, commonly known as chlorine bleach, is a concentrated solution comprising roughly equimolar amounts of sodium hypochlorite (NaOCl) and sodium chloride (NaCl). Usually, a smaller, variable amount of sodium hydroxide (NaOH) is also present. Minor amounts of sodium carbonate ($Na_2CO_3$), sodium bicarbonate ($NaHCO_3$) and sodium chlorate ($NaClO_3$) may also be present.

Sodium hypochlorite bleach is a large volume product of the chemical industry. The United States market has estimated worth of 305 million dollars per year, and US consumption, expressed in terms of NaOCl content, is about 962 million kilograms per year.

In addition to familiar laundry use, sodium hypochlorite bleach has numerous industrial applications, including bleaching paper, chemical synthesis, and water treatment to control microbes and destroy harmful pollutants.

Sodium hypochlorite is chemically unstable and decomposes with time, degrading quality of the bleach:

$$3NaOCl \rightarrow NaClO_3 + 2NaCl$$

$$2NaOCl \rightarrow 2NaCl + O_2$$

Decomposition of NaOCl can be quite rapid in the case of industrial strength bleaches containing 10 to 15 weight % NaOCl, and the rate of decomposition is further increased by high temperature and presence of impurities.

Sodium hydroxide (NaOH) is added to bleach to slow decomposition but control is imperfect. The NaOH in bleach is itself unstable, reacting with carbon dioxide from air to produce sodium carbonate:

$$2NaOH + CO_2 \rightarrow Na_2CO_3 + H_2O$$

The concentration of NaOH in bleach is highly variable and rarely, if ever, reported in a Product Data Sheet or label on the bottle or larger container containing bleach.

Decomposition is a particular problem at dispersed industrial sites where bleach is periodically delivered and stored for some period of time before being used. The bleach delivered commonly contains about 12 weight % active $Cl_2$=12.6 w/v % NaOCl, contaminants catalyzing decomposition are frequently present in the storage tanks, and outdoor storage tanks heat up in summer time.

Degradation of bleach is economically harmful in several respects. If bleach that has lost part of its NaOCl content is used, poor process performance or incomplete water purification results. Poor performance is frequently avoided by increasing the amount of bleach applied, and too much bleach is applied "just to be sure" increasing process cost.

Applying the optimal amount of bleach requires knowing how much NaOCl is actually present in the bleach. A simple, portable method for analyzing bleach is needed, one that can be carried around with technicians, field engineers and sales representatives to be used at diverse industrial sites as needed. The ability to easily analyze bleach would also benefit producers, distributors and retailers of bleach, and personnel who service swimming pools and water treatment systems.

A wide variety of chemical kits are available to measure various substances in water at dispersed locations. Commonly, the required reagents are packaged in small packets, as tablets, as premeasured solutions in capped tubes or in dropper bottles, and a portable colorimeter or spectrophotometer is used to read the result.

A colorimetric method to determine active chlorine in water using DPD (N,N-diethyl-p-phenylenediamine) is widely available and used. It is, however, limited to a range of about 0-3.5 ppm active chlorine (0-3.7 ppm NaOCl). Analyzing a bleach that contains 12% active $Cl_2$ would require diluting it by a factor of at least 35,000 using ultrapure water for the last of several dilution steps. A method using potassium iodide (KI) and a mild acid has a stated range of 0-250 ppm active $Cl_2$. Dilution by a factor of 480 would still be required.

A commercially available, field portable kit for bleach analysis without the need for multistep dilution involves titrating the bleach with sodium thiosulfate ($Na_2S_2O_3$) using a compact mechanical burette. This method is used to analyze bleach in the laboratory, but is complex and cumbersome for use in the field.

SUMMARY OF THE INVENTION

Sodium hypochlorite bleach has a faint yellow color and can, in principle, be analyzed colorimetrically, undiluted, without using reagents, at 400 nm or shorter wavelength (FIG. 1). A dedicated, field portable colorimeter is available to measure sodium hypochlorite in undiluted bleach without need for reagent chemicals. Because the yellow color of bleach is faint, the use of this instrument is limited to undiluted bleach or bleach diluted by no more than about 10×.

Sodium hypobromite (NaOBr) has a much more intense color (FIG. 1) and can be measured over a wide range of concentration (about 0.1 to 20 volume % bleach), with wavelength selected to give a response that the colorimeter or spectrophotometer can accurately quantify (typically Absorbance between 0.1 and 1.0).

Sodium hypochlorite can be quantitatively converted to NaOBr by reaction with a soluble bromide salt; for example, potassium bromide (KBr):

$$NaOCl + KBr \rightarrow NaOBr + KCl$$

The major reaction pathway is $$HOCl + Br^- \rightarrow HOBr + Cl^-$$

Therefore, the rate of reaction is proportional to the small concentration of HOCl present in solution which is controlled by the concentration of hydrogen ion and pH:

$$OCl^- + H^+ \rightarrow HOCl$$

The pH of bleach is determined by the concentration of NaOH. Commonly, the concentration of NaOH is high enough to make the reaction of NaOCl with bromide too slow to be of practical use in chemical analysis.

Therefore, the solution comprising bleach and bromide salt must be buffered to keep pH below about 12. However, the resulting pH cannot be too low, because at pH below about pH 10.3 a significant fraction of hypobromite ion will be protonated forming HOBr $$OBr^- + H^+ \rightarrow HOBr$$

which absorbs light less strongly, whereby a negative error in the reading would result.

At still lower pH, a variety of reactions will consume some of the $OBr^-$ produced; for example, $$OBr^- + Br^- + 2H^+ \rightarrow Br_2 + H_2O$$

In addition to $Br_2$, $Br_3^-$ and $Br_2Cl^-$ may be produced; all three absorb light much more strongly than $OBr^-$, whereby a positive error in the reading may result. Also, toxic fumes of HOBr, HOCl, BrCl, $Br_2$, etc., may be produced.

A buffer comprising $K_2HPO_4$ and $K_3PO_4$ can keep pH within the preferred range 11 to 12 over a wide range of NaOH concentration that may be encountered in the bleach being analyzed. While using a phosphate buffer is the preferred embodiment of the invention, other buffer systems may also be used under certain circumstances; for example, the combination of sodium bicarbonate with potassium carbonate.

Any soluble bromide salt wherein the cation doesn't react with hypochlorite, and doesn't precipitate at high pH can be used; for example, LiBr, NaBr or KBr.

The buffer can most conveniently be compounded together with the soluble bromide salt in a single reagent solution or reagent powder. A concentrated reagent solution can be used with a larger volume diluted bleach, or in combination with bleach and water. A dilute reagent solution can be used with a small volume of undiluted bleach.

DESCRIPTION OF DRAWINGS

FIG. 4 presents calculated results that illustrate performance of the method applied to bleach that contains no NaOH over a range of NaOCl content, using several phosphate buffers. The curves are labeled with concentrations in mg-mols/L of phosphate anions in the dilute reagent solutions modeled. pH values at NaOCl=0 refer to the reagent solution alone, before bleach is added.

FIG. 5 presents calculated results that illustrate performance of the method applied to bleach that contains no NaOH over a range of NaOCl content, using several carbonate buffers.

FIG. 6 presents calculated results that illustrate performance of the method applied to bleach that contains no NaOH over a range of NaOCl content, using several borate buffers.

FIG. 7 demonstrates performance of the method analyzing six bleaches under realistic conditions, wherein a dilute reagent solution is prepackaged in capped tubes and bleach is added to the tube. Also demonstrated is using a reagent mixture (KBr and a phosphate buffer) provided as a dry powder which is dissolved in water and bleach added to the solution.

Four Tables follow the text of this Specification. Data in Table 4 are specifically related to data in FIGS. 4, 5 and 6 involving dilute reagent solutions.

DEFINITION OF TERMS 1 w/v % of "Active chlorine"=1.05 w/v % sodium hypochlorite.

"Alkali in the bleach" means NaOH and/or KOH.

"The bleach analyzed" may be bleach to which acid or alkali has been added to change the amount of NaOH in the bleach before analyzing it. In this case, the acid or base added is to be considered part of the buffer system used.

"Boric acid" is $H_3BO_3$.

"Buffer" is the combination of an acid component together with the corresponding base component (usually the acid component minus a hydrogen ion) which together control pH of a solution.

"Buffer salts" are the acid and base constituents of the buffer.

"Transmittance" or "T" is the fraction of light illuminating the sample cell in a spectrophotometer or colorimeter which passes through the cell, normally recorded at a single wavelength.

"Absorbance" or "A" is related to transmittance by $$A = -\log_{10} T$$

When most of the light absorbed is absorbed by a single species in the sample, Absorbance is essentially proportional to concentration of that species in the sample.

"Mixed Solution" or "Solution measured" is the solution comprising bleach, buffer salts and water the Absorbance of which is measured.

DETAILED DESCRIPTION OF THE INVENTION

The several Examples that follow provide a detailed description of the invention as demonstrated in the laboratory and practically implemented.

Comparison Example

Table 1 describes the bleach compositions used to generate Examples of the invention. Concentration of NaOCl was determined by iodometric titration with 0.1M sodium thiosulfate. Concentrations of NaOH and sodium carbonate were determined by two stage titration with 0.1N HCl, using mixed indicators to precisely define the two end-points.

Bleach 3Z was made by adding a small amount of hydrochloric acid to Bleach 3 to neutralize the small amount of NaOH in Bleach 3. Bleach 4 was made by adding NaOH to Bleach 3 to bring NaOH content up to 10 g/L.

The other bleaches were analyzed as purchased. Included are inexpensive laundry bleaches with NaOCl<3 w/v % and no NaOH, bleaches containing about 7 w/v % NaOCl used for disinfecting surfaces, and bleaches containing about 10 w/v % NaOCl sold as "chlorinating liquids" for swimming pools.

Figure 2:
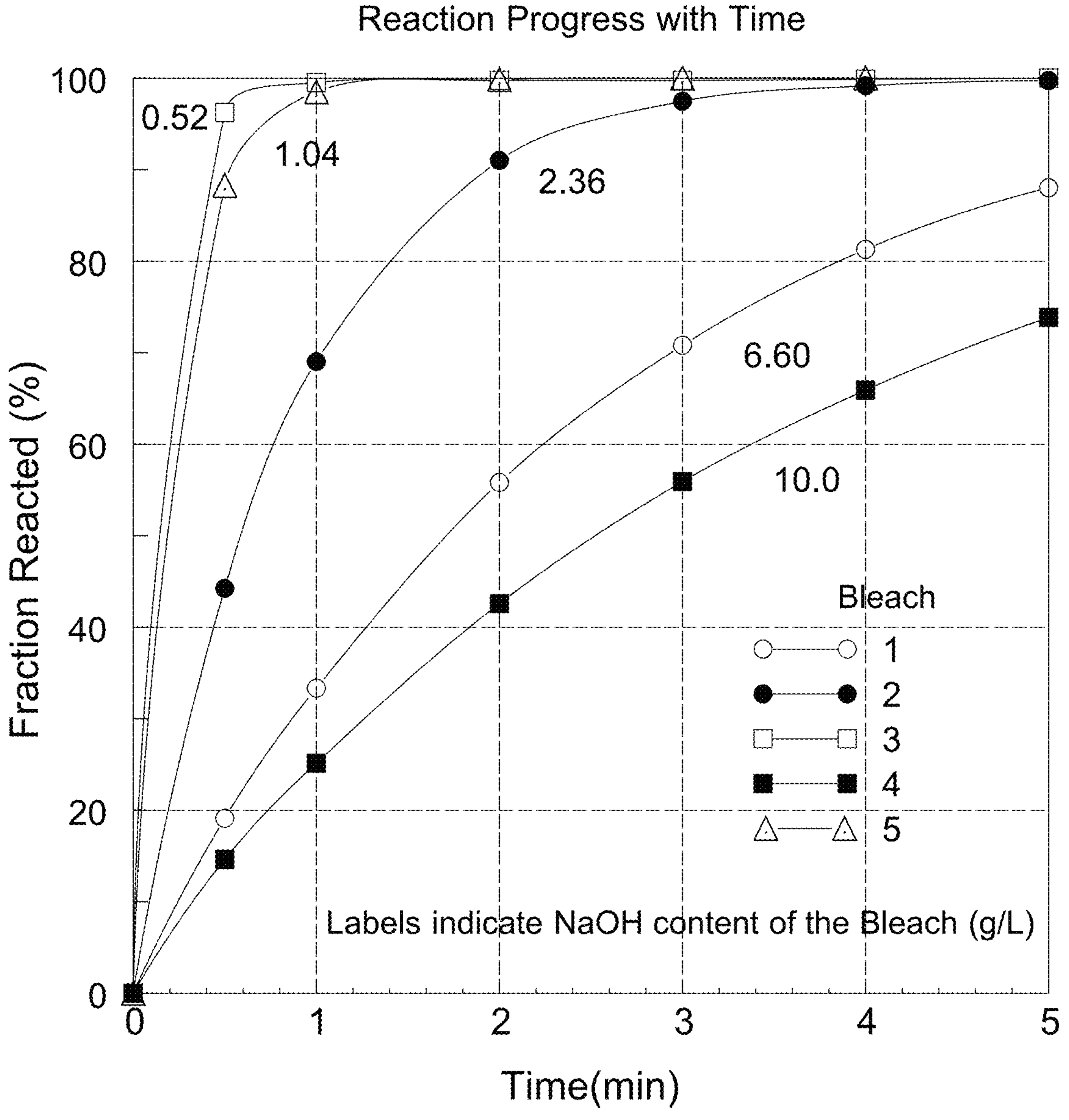
FIG. 2 illustrates the effect of NaOH content of the bleach upon the rate of reaction of diluted bleach with KBr producing hypobromite ion.

FIG. 2 illustrates the effect of NaOH content upon rate of reaction. In each case, the bleach was diluted to 10 volume %, and 1 mL of 2.25M KBr solution was added to 10 mL of the diluted bleach. Absorbance was measured at 460 nm in a square 1 cm cell as a function of time. In every case, the value of Absorbance recorded was divided by the final value when the reaction was complete, and reaction progress was plotted as percent of the final value.

Bleach 3Z containing no NaOH (not shown) reached 100% within 30 seconds. With bleach containing 0.52 or 1.04 g/L NaOH reaction was >98% complete within one minute. However, reaction of bleaches containing 2.36, 6.60 and 10.0 g/L NaOH was much slower, too slow for KBr alone to be of practical use in chemical analysis.

Example 1

The reagent solution or powder used should contain more than enough soluble bromide salt to convert all of the hypochlorite that may be present in the bleach analyzed (that is, bromide in stoichiometric excess of hypochlorite), and enough of the buffer in acid form to neutralize all of the NaOH that may be present in the bleach.

Industrial bleach may contain up to 15 w/v % active chlorine=2.12M NaOCl. It may also contain up to 10 g/L NaOH=0.25M. Therefore, a reagent solution compounded to react with bleach up to this extreme composition in a 1:1 volume ratio should contain at least 2.12M soluble bromide salt, and at least 0.25M of the buffering compound in acid form.

Compositions of several concentrated reagent solutions tested are presented in Table 2. These concentrated reagent solutions are formulated to be combined with an equal volume of undiluted bleach plus water of dilution.

In fact, the concentrated reagent solution should contain more than 0.25M buffering compound in acid form to ensure that the solution comprising reagent and bleach is still buffered even if the bleach actually contains 10 g/L NaOH. Also, some amount of the buffering compound in base form should also be present to ensure that the solution is buffered even if the bleach contain no NaOH.

Reagent solutions Carb1, Phos2, Phos3 and Phos4 satisfy these requirements.

Potassium salts are favored in formulating Reagent Solutions because they are more soluble than the corresponding sodium salts, making the solutions easier to prepare.

Example 2

Reaction of Bleaches 3Z and 4, containing 0 and 10 g/L NaOH respectively, was tested with each of the six reagent solutions in Table 2. The goal of the test series was to determine which buffers at what dilution ratios would satisfy two practical requirements over the entire range of NaOH concentration:

1. At least 99% conversion of hypochlorite to hypobromite within one minute, and
2. Absorbance decreases after reaching peak value not more rapidly than one percent per minute.

The results are summarized in Table 3. In the Table "v % bleach" is the percentage of bleach in the mixed solution comprising bleach, reagent solution and water of dilution. Thus 50 v % describes combining 5 mL bleach with 5 mL reagent solution, while 9.1 v % bleach describes adding 1mL concentrated reagent solution to bleach that has been diluted to 10% with water; in other words, 1 mL bleach+9 mL water+1 mL concentrated reagent solution for a total of 11 mL.

Ninety-nine percent conversion within one minute is achieved in all cases except Bleach 4 with KBr alone.

At 9.1% bleach, the four phosphate reagents and KBr alone give decay rate <1%/min; Carb1 with bleach 3Z does not.

Thus, all four Phosphate reagent solutions satisfy both requirements at 9.1 v % bleach.

At 20 v % bleach, Phos2 gives decay rate just over 1%/min with Bleach 3Z and 0.05%/min with Bleach 4; with Bleach 3Z Carb1 and Phos1 exceed 1%/minute.

At 50 v % bleach, all combinations except Bleach 3Z with KBr alone produce decay rates >1% minute.

Thus, about 20 v % bleach represents the upper limit if the two requirements are to be satisfied over the entire range 0 to 10 g/L NaOH and 0 to 10 w/v % NaOCl.

Decay rate is very small with KBr alone at all bleach concentrations tested. Higher decay rates with the other reagent solutions are likely due to acid catalysis by $HCO_3^-$ and $HPO_4^{-2}$.

Example 3

Because bleach is a highly concentrated solution it must be diluted to be analyzed. Simply adding reagent powder to undiluted bleach would require a large amount of powder and getting all of it dissolve would be a challenge. Also, the color developed would rapidly decay.

Diluting the bleach to about 10 v % for analysis, or compounding a dilute reagent solution to produce about 10 v % in the mixture with bleach is convenient, and minimizes handling undiluted bleach. Of course, the bleach can be diluted further or a bit less, and solutions containing bleach over a wide range of concentrations can be analyzed.

FIG. 4 illustrates analyzing the six of the first seven bleaches in Table 1 (all except 3Z) diluted to 10, 1 and 0.1 volume %. In each case, 1 mL of Phos2 reagent solution was added to 10 mL of the diluted bleach and Absorbance in a 1 cm square cell was read after about one minute. Dilution to 10% in FIG. 3 corresponds to 9.1 v % bleach in the mixture in Table 3, because adding 1 mL concentrated reagent solution to 10 mL of 10% bleach produces a mixed solution containing 9.1 v % bleach.

Figure 1:
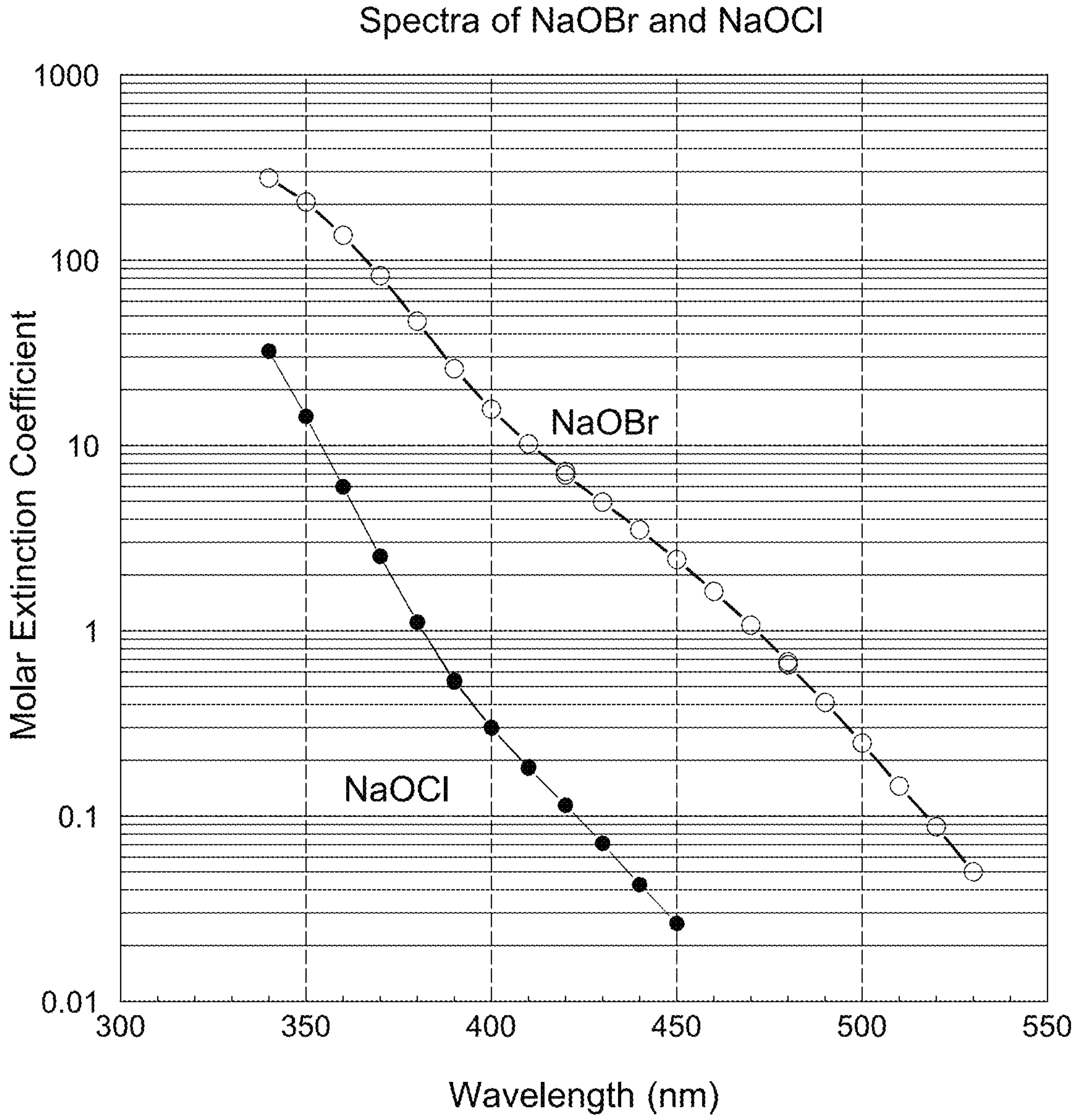
FIG. 1 presents the absorption spectra of NaOCl and NaOBr.

Absorbance is a function of wavelength as well as concentration (FIG. 1), and was measured at a different wavelength at each level of dilution resulting to produce Absorbance values in a range enabling measurements with adequate resolution and accuracy.

A bleach containing 12 w/v % active chlorine diluted to 0.1 v % would contain 120 ppm active chlorine, overlapping the concentration range analyzed by reaction with potassium iodide in acid solution.

Example 4

FIG. 4 presents chemical modeling results produced using the computer program described in U.S. Pat. No. 11,884,540 of Weres and Baron (First and second dissociation of phosphoric acid following R. E. Mesmer and C. F. Baes, Jr. J. Solution Chem., 3:4, 307-322 (1974). Third pKa=12.375 at I=0 and ionic strength correction calculated using Debye-Huckel formula with a=4.3 Angstrom for both phosphate ions. Dissociation of water following R. H. Busey and R. E. Mesmer, J. Solution Chem., vol. 5, 147-152 (1976). Activity of hydrogen ion and pH calculated using Debye-Huckel formula with B-dot extension, a=9 Angstroms, B-dot=0.0362 at 25° C.)

Each dilute reagent solution modeled contains 0.225M KBr along with potassium phosphate salts at the indicated concentrations. In each case modeled, 10 mL of the dilute reagent solution is combined with 1 mL of undiluted bleach containing no NaOH, and the reaction goes to equilibrium, whereby NaOCl is replaced by NaOBr.

The dilute reagent solution containing 0.225M KBr plus 0.05M $HPO_{42}^{-2}$ (Phos1d in Table 4) is concentrated reagent solution Phos1 in Table 2 diluted 10×.

pKa of HOBr is about 8.6 at I=0, and decreases with increasing ionic strength. Because HOBr absorbs light less strongly than $OBr^-$, protonation to HOBr will decrease measured Absorbance value as pH is decreased, producing a growing negative error in the result. The ratio of Absorbance of HOBr:$OBr^-$ is estimated to be about 0.273 near to 440 nm. The negative error caused by protonation of $OBr^-$ is therefore estimated to equal $$0.727\times\{[HOBr]/([HOBr]+[OBr^-])\}\times 100\%$$

where the fraction HOBr is calculated.

As pH decreases further, a variety of di- and triatomic halogen species are produced, particularly $Br_2$, $Br_2Cl^-$ and $Br_3^-$ which are more strongly colored than $OBr^-$. The Absorbance ratio $Br_2$:$OBr^-$ at 440 nm is 15, and Absorbance by $Br_2Cl^-$ and $Br_3^-$ is comparable to $Br_2$. Therefore, formation of these species increases Absorbance producing a positive error estimated to equal $$15\times([Br_2]+[Br_2Cl^-]+[Br_3^-])/[OBr^-]\times 100\%.$$

Table 4 presents buffer compositions and calculated pH values of dilute reagent solutions comprising 0.225M KBr and various buffers without bleach, and the ratio of base/acid species in each buffer. In calculating these ratios, $KH_2PO_4$ is considered as "negative $K_3PO_4$".

Figure 3:
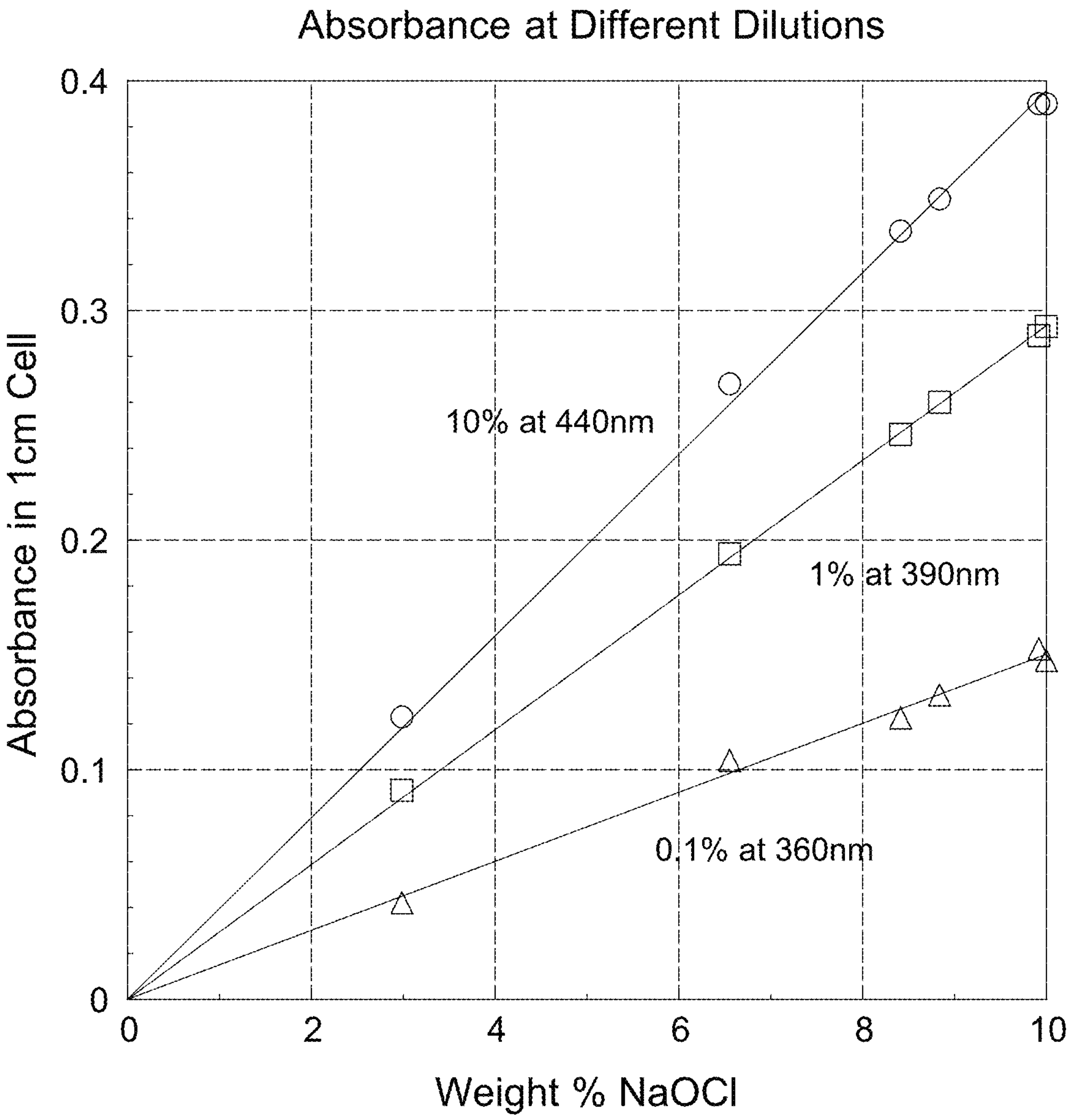
FIG. 3 illustrates Absorbance of several bleaches diluted to 10, 1 and 0.1% at 440, 390 and 360 nm, respectively, after a buffered reagent solution comprising KBr and a phosphate buffer is added.

Dilute reagent solution containing the 0/0.05/0 buffer ($K_2HPO_4$ alone) has pH 9.51. When combined with bleach that contains no NaOH, the NaOBr produced buffers the solution more strongly than K2HPO4 increasing pH. Increased pH decreases both negative and positive errors. When NaOCl=10 w/v %, both errors are negligible, but errors increase as NaOCl approaches 0. Using reagent solution containing $K_2HPO_4$ alone will give errors not exceeding 1% if concentration of NaOCl>2.5 w/v % even if NaOH=0. This conclusion applies to bleach fraction about 10 v % in the mixture of bleach, water and reagent. If the bleach is more highly diluted, as illustrated in FIG. 3, the errors will be much larger at NaOH=0 and may be significant even it the bleach contains some NaOH.

If the buffer includes even a small amount of $KH_2PO_4$ errors at low values of NaOCl are much larger.

However, if the reagent solution contains some $K_3PO_4$, for example a dilute reagent solution containing 0/0.05/0.005 phosphate buffer, pH when mixed with bleach will be much higher and errors negligible throughout the range of NaOCl concentration, even when NaOH approaches 0.

Therefore, the average negative charge/phosphorus atom in the buffer should be at least 2; that is, $K_2HPO_4$ with no $KH_2PO_4$. The reagent solution should also contain some $K_3PO_4$ providing negative charge/phosphorus atom>2; for example, the 0/0.05/0.01 buffer with negative charge/phosphorus atom=(2×0.05+3×0.01)/(0.05+0.01)=2.167.

The entirety of results in FIGS. 4, 5 and 6 and Table 4 suggest that both errors will be <1% if the dilute reagent solution without bleach has calculated pH>10.3. Allowing for errors of calculation and/or measurement, pH 11 or greater is recommended and is easily provided using the phosphate buffer system.

Example 5

FIG. 5 presents analogous calculated results using dilute reagent solutions containing 0.225M KBr and $NaHCO_3$/$K_2CO_3$ buffers at several ratios. (First dissociation of $CO_2$ following C. S. Patterson et al., Geochimica et Cosmochimica Acta, vol. 46, 1653-1663 (1982). Second dissociation following F. Millero, et al., Geochimica et Cosmochimica Acta, vol. 71, 46-55 (2007).) The effect of NaOCl concentration on pH is small, especially at the higher ratios, because the mixture of dilute reagent solution and bleach is well buffered in every case, and NaOBr produced has little effect on pH.

Soluble bicarbonate and carbonate salts other than $NaHCO_3$ and $K_2CO_3$ can also be used.

A ratio of carbonate to bicarbonate>1 is needed to provide negative error<3%, ratio at least 2 to provide error of 2%, and ratio at least 4 to provide 1%. The bicarbonate/carbonate buffer system is practically limited to dilute reagent solutions, because concentrated reagent solutions at the higher buffer ratios would be quite concentrated indeed, and the amount of dry powder to be combined with 1 mL bleach plus water would be quite large.

Example 6

FIG. 6 presents analogous results using dilute reagent solutions containing the $H_3BO_3$/$NaH_2BO_3$ buffer system at several ratios. (Dissociation of boric acid following R. E. Mesmer, et al., Inorg. Chem., vol. 11, 537-543 (1972).) Because $H_3BO_3$ is a weak acid, high ratios of $NaH_2BO_3$:$H_3BO_3$ are needed to provide acceptable negative error, not less than 5:1. As with carbonate buffers, using borate buffers is practically limited to dilute reagent solutions. The buffer can be prepared using a different borate salt, or by combining boric acid with an alkali.

Example 7

The last two columns in Table 4 present experimental data like that presented in Table 3. In each case, 10 mL of dilute reagent solution was combined with 1 mL bleach, and Absorbance in a 1 cm square cell was recorded at 440 nm every minute up to 4 or 5 minutes. Each dilute reagent solution was tested with Bleach 3Z (NaOCl=10 w/v %, NaOH=0) and Bleach 4 (NaOCl=10 w/v %, NaOH=10 g/L). In every case, Absorbance reached 99% of its maximum value within 1 minute, and the rate of slow decline past the maximum was calculated.

Each of the dilute reagent solutions containing phosphate buffers provided decline <1%/min.

Carbonate: bicarbonate ≥ 2 provided decline ≤1%/min.

Borate: Boric Acid>2 provided decline ≤1%/min.

Example 8

The silicate buffer couple $HSiO_3^-$:$SiO_3^{-2}$ is another possibility. A dilute reagent solution containing this buffer cannot reliably be modeled because the second dissociation constant of silicic acid (that is, $SiO_2$ in solution) is not known with sufficient accuracy.

Similar to the phosphate buffer system, the ratio of average negative charge/silicon atom should be greater 1, and preferably not less than 1.167. The ratio in a dilute reagent solution with composition 0.1125M KBr+0.025 $NaHSiO_3$+0.005 $Na_2SiO_3$ would be (0.025×1+0.005×2)/(0.025+0.005)=1.167. Ten mL of this dilute reagent solution would be combined with 0.50 mL undiluted bleach. To compensate for the smaller concentration of OBr in the mixed solution, read Absorbance at shorter wavelength; for example, 420 nm. The buffer can also be prepared using different silicate salts.

The silicate buffer system is limited to dilute reagent solutions because $Si(OH)_5^-$ forms polymeric species at concentrations >0.05M or so. Therefore, the concentration of $Si(OH)_5^-$ in a dilute reagent solution should not exceed 0.05M, and preferably be smaller; for example, not greater than 0.025M as in the composition above.

Because solid salts of $Si(OH)_5^-$ are highly polymerized and of variable composition; the silicate buffer should be made by combining $Na_2SiO_3$ (which is well defined and easily soluble) with acid to convert part of the $SiO_3^{-2}$ to $HSiO_3^-$. For example, combine 0.1125M KBr+0.030M $Na_2SiO_3$+0.025M HCl to make a dilute reagent solution with composition proposed above+0.025 NaCl.

Example 9

Germanium dioxide ($GeO_2$) has chemical properties generally similar to $SiO_2$ and reaction with NaOH forms soluble salts analogous to the sodium silicates discussed above. Although expensive, a dilute reagent solution could be prepared using the buffer couple $HGeO_3^-$:$GeO_3^{-2}$, prepared by adding acid to a solution containing $Na_2GeO_3$.

As with $HSiO_3^-$, $HGeO_3^-$ tends to polymerize, even more so than $HSiO_3^-$, whereby the concentration of $HGeO_3^-$ should not exceed 0.025M, and preferably not exceed 0.01M. As with the silicate buffer, the average negative charge/germanium atom should be greater 1, and preferably not less than 1.167.

Example 10

Dilute reagent solution can be prepackaged in capped test tubes. Some undiluted bleach is added to the tube, and the tube placed in a colorimeter or spectrophotometer to measure Absorbance at a predetermined wavelength. Absorbance will quickly approach a terminal value proportional to the concentration of NaOCl initially in the bleach.

This method was demonstrated using 7 mL of Phos2 concentrated reagent diluted 7× (1 part to 6 parts water) in 16×100 mm capped test tubes with 11.4 mL volume. One mL of undiluted bleach was added to the tube, the tube capped and shaken, and Absorbance measured at 440 nm. A compact, field portable spectrophotometer commonly used with reagent solutions prepackaged in tubes or as powders in laminated foil packets was used. Results obtained analyzing bleaches 11 to 18 in Table 1 are presented in FIG. 7. At this wavelength 10 w/v % NaOCl gives Abs=1.0. Stable color was attained within one minute after adding the bleach, then capping and shaking the tube. Absorbance values can be adjusted by changing wavelength.

One mL bleach combined with 7 mL diluted reagent solution gives 12.5 v % bleach, well below the 20 v % limit recommended. Eight mL combined volume fits comfortably in the 11.4 mL tube, allowing effective mixing by shaking the tube.

Because the chemical constituents of the reagent solution are stable, tubes filled with a dilute reagent solution would have a long shelf life.

Example 11

The reagent chemicals (soluble bromide salt and buffer salts comprising the buffer) can also be provided as a dry powder which is dissolved in water and bleach added at the point of use.

A power comprising 62.3% NaBr+23.4% $K_2HPO_4$+14.3% $K_3PO_4$ by weight was prepared. The mols of NaBr and phosphate salts in 372 mg of this powder would equal mols in 1 mL of the Phos2 Reagent Solution. Sodium bromide (NaBr) is preferred over KBr in preparing a dry reagent powder because it is less hygroscopic and easier to pulverize together with the phosphate salts. However, $K_3PO_4$ is preferred over $Na_3PO_4$ because $Na_3PO_4$ is strongly hygroscopic and hard to prepare or process as the anhydrous salt. There is no practical difference between $K_2HPO_4$ and $Na_2HPO_4$ whereby either one can be used.

About 400 mg of this powder was dissolved in 10 mL water in a 1 inch (25.4 mm) square cell. One mL bleach was added, and Absorbance read at 460 nm. Results analyzing bleaches 11 to 18 are presented in FIG. 7. Shorter wavelength would provide greater Absorbance. Practically the same results would be obtained combining 1 mL concentrated Phos2 reagent solution with 9 mL water and 1 mL bleach.

Example 12

Combining bleach, Phos2 reagent solution and water in proportions of 20:20:60 produces a solution with intense yellow color which is practically stable for several minutes. The concentration of active chlorine in the bleach can approximately determined comparing this color to a series of colored reference solutions in tubes or reference colors on a chart. Other concentrated reagent solutions can be used.

Conclusions and Ramifications

Reaction of bleach with a soluble bromide salt to produce brightly colored hypobromite ion enables easy colorimetric measurement of active chlorine or NaOCl content in the bleach.

LiBr, NaBr, KBr or another bromide salt soluble at high pH may be used.

This analytical method is well suited for use outside the laboratory at sites where bleach is stored or used; for example, industrial sites that use bleach, places where bleach is used to destroy microbes and/or hazardous substances in water, or commercial laundries.

In addition to analyzing bleach itself, process water streams containing some amount of bleach or another source of active chlorine can be analyzed over a wide range of concentration. For example, about 1% bleach is commonly added to the water in a washing machine and the wash water can be analyzed. The source of active chlorine being measured in water need not be bleach; active chlorine introduced as chlorine gas or another way can also be measured.

While a variety of examples have been described that show significant advantages over the compositions and methods of prior art, it will be appreciated that many changes to these examples are possible and that many other examples could have been devised without departing from the scope of the invention as claimed.

This analytical method can be defined in terms of the buffer system chosen, the ratio of base component of the buffer to acid component in the buffer, proportions of bleach, soluble bromide salt and water combined to produce the mixed solution, pH of the mixed solution, time allowed for reaction, cuvette or tube used to measuring Absorbance, and wavelength at which Absorbance is measured.

These variables are specified based on the range of bleach compositions that might need to be analyzed. The concentrated reagent solutions described herein are designed to cover the range of 0 to 15 w/v % active chlorine (0 to 16.05 w/v % NaOCl) and 0 to 10 g/L NaOH when 1 mL of undiluted bleach is combined with 1 mL of the concentrated reagent and water of dilution. Actually, the amount of acid component of the buffer included is enough to consume 20 g/L NaOH and can be reduced by nearly 50%. The amount of acid component of the buffer in the mixed solution should be in stoichiometric excess of alkali contributed by the bleach analyzed. The dilute reagent solutions described can be viewed as concentrated reagent solutions diluted by some factor; for example 10× in FIGS. 4, 5 and 6, or 7× in relation to the upper line in FIG. 7. The point is to maintain the same proportions of bromide salt and buffer to bleach in the mixed solution.

The amounts of soluble bromide salt and buffer in the reagent powder or solution can be adjusted in rough proportion to the concentrations of NaOCl and NaOH in range of bleach composition anticipated. If it is known in advance that the bleach analyzed contains a certain amount of NaOH, the amount of base component in the buffer can be reduced, or in the case phosphate, silicate and germanate buffers perhaps completely removed.

The buffer used must be stable in the presence of NaOCl, NaOBr and high pH. That is, the buffer cannot develop a color, and pH must not shift significantly over several minutes needed to perform the analysis. Also, the buffer cannot catalyze the decomposition of NaOBr to a degree noticeable over the period of time required. The five inorganic buffer systems discussed in Examples 4, 5, 6, 8 and 9 meet these requirements. It is possible that additional buffer systems meeting these requirement may be identified, including organic buffers. The analytical method described is not limited to these five buffers systems, or inorganic buffers in general; suitable organic buffers might serve.

The method can also be described in terms of performance required, for example:

(a) Ability to reliably analyze bleaches over a certain range of NaOCl concentration; for example, 0 to 10, 12, 15, or 18 w/v %.

(b) Ability to reliably analyze bleaches over a certain range of NaOH concentration; for example, 0 to 5, 7.5, 10, 12.5 or 15 w/v %.

(c) pH of the reagent solution containing bromide salt, buffer and water of dilution but no bleach; for example, not less than 10.3, 10.5, 10.8, 11 or 11.5.

(d) pH of the mixed solution containing bromide salt, buffer, bleach and water of dilution; for example, not less than 10.3, 10.5, 10.8, 11 or 11.5.

(e) Measured Absorbance within a range consistent with easy and precise measurement; for example, Absorbance between 0.1 and 1.0. Along with composition of the mixed solution, Absorbance will be determined by the cuvette or tube used in the spectrophotometer or colorimeter, and the wavelength used to make the measurement; for example, a wavelength within the range 360 to 480 nm.

(f) The reaction time needed to reach a predetermined fraction of the Maximum Absorbance value; for example, not more than 0.5, 1, 2, 3, 4, 5, 10, 15 or 20 minutes.

(g) The predetermined fraction of maximum Absorbance to be reached within a predetermined time; for example, at least 99.5, 99, 98, 97, 95 or 90%

(h) The maximum rate of decline of Absorbance after Absorbance reaches its maximum value; for example, not more than 0.1, 0.5, 1, 2, 3 or 5% per minute.

TABLE 1

Composition of Bleaches Titrated and Analyzed

| Bleach | Density g/cm$^3$ | NaOCl mol/L | NaOCl w/v % | $Cl_2$ w/v % | NaOH mol/L | NaOH g/L | $Na_2CO_3$ mol/L | $NaHCO_3$ mol/L |
|---|---|---|---|---|---|---|---|---|
| 1 | 1.110 | 0.880 | 6.55 | 6.24 | 0.165 | 6.60 | 0.016 | 0.0 |
| 2 | 1.146 | 1.187 | 8.84 | 8.42 | 0.059 | 2.36 | 0.014 | 0.0 |
| 3 | 1.159 | 1.343 | 10.00 | 9.52 | 0.013 | 0.52 | 0.014 | 0.0 |
| 3Z | — | 1.343 | 10.00 | 9.52 | 0.0 | 0.0 | 0.014 | — |
| 4 | — | 1.332 | 9.92 | 9.44 | 0.25 | 10.0 | 0.014 | 0.0 |
| 5 | 1.104 | 1.130 | 8.41 | 8.01 | 0.026 | 1.04 | 0.053 | 0.0 |
| 6 | 1.036 | 0.401 | 2.99 | 2.84 | 0.0 | 0.0 | — | — |
| 11 | — | 0.2479 | 1.84 | 1.76 | 0.0 | 0.0 | 0.0 | 0.008 |
| 12 | — | 0.3301 | 2.46 | 2.34 | 0.0 | 0.0 | 0.0 | 0.008 |
| 13 | — | 0.9698 | 7.22 | 6.88 | 0.1475 | 5.90 | 0.013 | 0.0 |
| 14 | — | 0.8971 | 6.68 | 6.36 | 0.143 | 5.72 | 0.015 | 0.0 |
| 17 | — | 0.9334 | 6.95 | 6.62 | 0.1655 | 6.62 | 0.0 | 0.0 |
| 18 | — | 1.343 | 10.00 | 9.52 | 0.091 | 3.64 | 0.0 | 0.0 |

TABLE 2

Composition of Concentrated Reagent Solutions Tested (mol/L)

| Reagent Sol'n | KBr | Carb1 | Phos1 | Phos2 | Phos3 | Phos4 |
|---|---|---|---|---|---|---|
| KBr | 2.25 | 2.25 | 2.25 | 2.25 | 2.25 | 2.25 |
| $K_2HPO_4$ | | | 0.5 | 0.5 | 0.5 | 0.5 |
| $K_3PO_4$ | | | | 0.25 | 0.75 | 1.0 |
| $NaHCO_3$ | | 0.5 | | | | |
| $Na_2CO_3$ | | 0.5 | | | | |

TABLE 3

Comparison of Concentrated Reagent Solutions

| Bleach | v % Bleach | Reagent Solution KBr | Carb1 | Phos1 | Phos2 | Phos3 | Phos4 |
|---|---|---|---|---|---|---|---|
| | | 99% Reaction within Indicated Time (minutes) | | | | | |
| 3Z | 50 | 0.5 | 0.5 | 0.5 | 0.5 | 0.5 | 0.5 |
| 4 | 50 | >5 | 0.5 | 0.5 | 0.5 | 0.5 | 0.5 |
| 3Z | 20 | 0.5 | 0.5 | 0.5 | 0.5 | | |
| 4 | 20 | >5 | 0.5 | 0.5 | 0.5 | | |
| 3Z | 9.1 | 0.5 | 0.5 | 0.5 | 0.5 | 0.5 | 0.5 |
| 4 | 9.1 | >5 | 0.5 | 1 | 1 | 0.5 | 0.5 |
| | | Rate of Decrease after Peak Value (% per minute) | | | | | |
| 3Z | 50 | 0.09 | 29 | 18 | 18 | 17 | 17 |
| 4 | 50 | — | 27 | 2.9 | 4.5 | 7.3 | 7.0 |

TABLE 3-continued

| Comparison of Concentrated Reagent Solutions | | | | | | | |
|---|---|---|---|---|---|---|---|
| | v % | Reagent Solution | | | | | |
| Bleach | Bleach | KBr | Carb1 | Phos1 | Phos2 | Phos3 | Phos4 |
| 3Z | 20 | 0 | 13 | 2.5 | 1.1 | | |
| 4 | 20 | — | 3.7 | 0.28 | 0.05 | | |
| 3Z | 9.1 | 0 | 1.66 | 0.33 | 0.10 | 0 | 0.03 |
| 4 | 9.1 | — | 0.34 | 0.06 | 0.06 | 0.13 | 0.07 |

TABLE 4

Composition and Comparison of Dilute Reagent Solutions (mol/L)
Each dilute reagent solution also contains 0.225M KBr.

| Buffer | Composition (mol/L) | Ratio Base/Acid | Calc. pH | $-d \ln A/d t$ ($min^{-1}$) Bleach 3Z | Bleach 4 |
|---|---|---|---|---|---|
| | $KH_2PO_4/K_2HPO_4/K_3PO_4$ | | | | |
| PhosAd | 0.01/0.04/0 | −0.25 | 7.28 | 0.37 | 0.09 |
| PhosAAd | 0.01/0.05/0 | −0.20 | 7.36 | — | — |
| PhosA1d | 0.005/0.05/0 | −0.10 | 7.66 | — | — |
| Phos1d | 0/0.05/0 | 0.0 | 9.51 | 0.27 | 0 |
| — | 0/0.05/0.0005 | 0.01 | 10.36 | — | — |
| — | 0/0.05/0.001 | 0.02 | 10.65 | — | — |
| PhosB1d | 0/0.05/0.005 | 0.1 | 11.34 | — | — |
| PhosBd | 0/0.05/0.01 | 0.20 | 11.64 | 0.18 | 0 |
| Phos2d | 0/0.05/0.025 | 0.50 | 12.02 | 0.05 | 0 |
| | $NaHCO_3/K_2CO_3$ | | | | |
| Carb1d | 0.05/0.025 | 0.5 | 9.41 | 2.46 | 0.54 |
| Carb2d | 0.05/0.05 | 1 | 9.68 | 1.72 | 0.35 |
| Carb3d | 0.05/0.10 | 2 | 9.93 | 0.92 | 0.18 |
| Carb4d | 0.05/0.20 | 4 | 10.17 | 0.56 | 0.17 |
| Carb5d | 0.05/0.50 | 10 | 10.50 | — | — |
| | $H_3BO_3/NaH_2BO_3$ | | | | |
| Bor0d | 0.05/0.05 | 1 | 9.00 | 2.18 | 0.85 |
| Bor1d | 0.05/0.10 | 2 | 9.29 | 1.11 | 0.42 |
| Bor2d | 0.05/0.25 | 5 | 9.66 | 0.30 | 0.17 |
| Bor3d | 0.05/0.50 | 10 | 9.93 | 0.16 | 0.47 |

The invention claimed is:

1. A method to determine active chlorine in bleach which comprises forming a mixed solution comprising a predetermined volume fraction of chlorine bleach, a soluble bromide salt in stoichiometric excess to hypochlorite in the bleach, and a buffer, wherein the acid component of the buffer is in stoichiometric excess to alkali in the bleach, allowing time for absorption of light by the solution to develop, and measuring absorbance of light at a preselected wavelength, whereby said measured absorbance is essentially proportional to the concentration of active chlorine in the bleach.

2. The method of claim 1, wherein said buffer is formulated to make pH of said mixed solution exceed 9.51.

3. The method of claim 2, wherein absorbance of the mixed solution is measured using a colorimeter or a spectrophotometer.

4. The method of claim 2, wherein absorbance of light by the mixed solution is determined using a color comparison chart or color reference solutions.

5. The method of claim 2, wherein the buffer comprises a salt of the monohydrogenphosphate ion ($HPO_4^{-2}$).

6. The method of claim 5, wherein the buffer further comprises a salt of the phosphate ion ($PO_4^{-3}$).

7. The method of claim 2, wherein the buffer comprises a bicarbonate salt and a carbonate salt, and the mole ratio of carbonate to bicarbonate is at least 2.

8. The method of claim 7, wherein the mole ratio of carbonate to bicarbonate is at least four.

9. The method of claim 2, wherein the buffer comprises boric acid and a salt of $H_2BO_3^-$, and the mole ratio of $H_2BO_3^-$, to $H_3BO_3$, is at least 5.

10. The method of claim 2, wherein the buffer comprises a salt of $HSiO_3^-$, and a salt of $SiO_3^{-2}$.

11. The method of claim 2, wherein the buffer comprises a salt of $HGeO_3^-$and a salt of $GeO_3^{-2}$.

12. The method of claim 2 wherein said soluble bromide salt is selected from the class consisting of lithium bromide, sodium bromide and potassium bromide, and said soluble bromide salt and said buffer are combined in a single reagent solution.

13. The method of claim 12 wherein the bleach is diluted and said reagent solution is added to the diluted bleach.

14. The method of claim 12 wherein said reagent solution is prepared in dilute form or diluted and bleach is added to the dilute reagent solution.

15. The method of claim 2 wherein said buffer comprises buffer salts, said soluble bromide salt and said buffer salts are combined in a solid formulation, and said mixed solution is produced by combining said solid formulation, bleach and water.

16. The method of claim 2, wherein said buffer and the volume fraction of the bleach in said mixed solution are selected to ensure that absorbance at said preselected wavelength reaches a predetermined fraction of its maximum value within a predetermined time, and after said maximum value has been reached said absorbance does not decrease by more than a predetermined rate.

17. The method of claim 16 wherein said buffer and the volume fraction of bleach in said mixed solution are selected to ensure that said absorbance reaches ninety-nine percent of its maximum value within one minute.

18. The method of claim 16 wherein said buffer and the volume fraction of bleach in said mixed solution are selected to ensure that after said maximum value has been reached said absorbance does not decrease by more than one percent per minute.

19. The method of claim 12, wherein the pH said single reagent solution is at least 10.3.

20. The method of claim 19, wherein the pH said single reagent solution is at least 11.

* * * * *